US007704435B2

(12) United States Patent
Ishler

(10) Patent No.: US 7,704,435 B2
(45) Date of Patent: Apr. 27, 2010

(54) APPARATUS AND METHOD FOR UTILIZING A UNIVERSAL PLUNGER

(75) Inventor: Vincent Ishler, Mercersburg, PA (US)

(73) Assignee: Rampf Molds Industries, Inc., Hagerstown, MD (US)

( * ) Notice: Subject to any disclaimer, the term of this patent is extended or adjusted under 35 U.S.C. 154(b) by 681 days.

(21) Appl. No.: 11/192,170

(22) Filed: Jul. 29, 2005

(65) Prior Publication Data

US 2006/0172033 A1 Aug. 3, 2006

Related U.S. Application Data

(60) Provisional application No. 60/592,126, filed on Jul. 30, 2004.

(51) Int. Cl.
*B29C 43/32* (2006.01)

(52) U.S. Cl. ....................... 264/334; 264/336; 425/193; 425/416; 425/422

(58) Field of Classification Search ................. 425/193, 425/344, 346, 355, 412, 416, 419, 422, 444; 264/334, 336
See application file for complete search history.

(56) References Cited

U.S. PATENT DOCUMENTS 805,914 A 11/1905 Horr
813,592 A 2/1906 Schou
2,075,992 A 4/1937 Lux et al.
2,339,792 A 1/1944 Milano
2,479,350 A 8/1949 Haggart, Jr.
2,869,179 A 1/1959 Van Hartesveldt
2,887,755 A 5/1959 Zevely
3,593,373 A 7/1971 Loomis
3,694,128 A 9/1972 Foxen
3,932,098 A 1/1976 Huber et al.
3,940,229 A 2/1976 Hutton
4,179,258 A 12/1979 Karas et al.
4,235,580 A 11/1980 Springs et al.
4,407,766 A 10/1983 Haardt et al.
4,421,471 A 12/1983 Vogt
4,431,087 A * 2/1984 Karol ......................... 187/408
4,545,754 A 10/1985 Scheidt et al.
4,735,562 A 4/1988 Boutellier
4,941,813 A 7/1990 Grubb et al.
5,078,940 A 1/1992 Sayles
5,217,630 A 6/1993 Sayles
5,230,533 A * 7/1993 Yamaguchi ................. 280/775
5,445,514 A * 8/1995 Heitz ......................... 425/255

(Continued)

FOREIGN PATENT DOCUMENTS

CA 2 463 194 A1 10/2004

(Continued)

*Primary Examiner*—Yogendra Gupta
*Assistant Examiner*—Emmanuel S Luk
(74) *Attorney, Agent, or Firm*—Burr & Brown

(57) ABSTRACT

An assembly, for stripping a medium from a mold cavity according to one embodiment of the present invention, may include a stripper shoe, a head structure, and a plunger component attaching the stripper shoe to the head structure. The plunger component may have an elongated body, a first portion with a first end, and a second portion with a second end. The second portion may be substantially perpendicular to the first portion and have an opening configured to facilitate fastening the stripper shoe to the second portion of the plunger component.

16 Claims, 15 Drawing Sheets

U.S. PATENT DOCUMENTS

| | | | | |
|---|---|---|---|---|
| 5,533,885 | A | 7/1996 | Schlusselbauer | |
| 5,587,555 | A * | 12/1996 | Rinderer | 174/503 |
| 5,879,603 | A | 3/1999 | Sievert | |
| 5,943,827 | A * | 8/1999 | Okerlund | 52/28 |
| 5,952,015 | A | 9/1999 | DeWyre | |
| 6,113,379 | A | 9/2000 | LaCroix et al. | |
| 6,138,983 | A | 10/2000 | Sievert | |
| 6,209,848 | B1 | 4/2001 | Bolles et al. | |
| 6,224,815 | B1 | 5/2001 | LaCroix et al. | |
| 6,280,566 | B1 | 8/2001 | Naito et al. | |
| 6,464,199 | B1 | 10/2002 | Johnson | |
| 6,488,491 | B1 * | 12/2002 | Nelson et al. | 425/228 |
| 6,530,769 | B1 * | 3/2003 | Rondeau et al. | 425/186 |
| 6,764,294 | B2 * | 7/2004 | Saddler | 425/253 |
| 7,140,867 | B2 * | 11/2006 | Scherer et al. | 425/413 |
| 7,291,306 | B2 | 11/2007 | Ishler | |
| 2002/0025357 | A1 * | 2/2002 | Spangenberg et al. | 425/346 |
| 2003/0164574 | A1 | 9/2003 | Hammer et al. | |
| 2005/0116389 | A1 | 6/2005 | Hammer et al. | |

FOREIGN PATENT DOCUMENTS

| | | |
|---|---|---|
| DE | 2937704 | 3/1981 |
| DE | 4336744 | 5/1995 |
| DE | 2530098 | 1/1997 |
| DE | 19546745 | 6/1997 |
| DE | 19634499 | 3/1998 |
| DE | 19639640 | 4/1998 |
| GB | 2216938 | 10/1989 |
| JP | 2001191314 A | 7/2001 |

* cited by examiner

APPARATUS AND METHOD FOR UTILIZING A UNIVERSAL PLUNGER

This application claims priority from U.S. provisional patent application Ser. No. 60/592,126, filed Jul. 30, 2004, entitled "APPARATUS AND METHOD FOR UTILIZING A FLEXIBLE PLUNGER," the disclosure of which is incorporated herein, in its entirety, by reference.

FIELD OF THE INVENTION

The invention generally relates to concrete-based product making machinery, and more particularly to an apparatus and method for using a universal plunger in concrete-based product making machinery.

BACKGROUND OF THE INVENTION

Molded concrete products or masonry units for use in landscaping and design have seen increased popularity with the rise in personal home renovation and improvements. The production of these concrete masonry units is accomplished using different mold assemblies to shape and form different masonry units for objectives. For example, many masonry units are used to create decorative walls and borders in landscaping projects whereas other masonry units serve as interlocking members to create interesting walkways and paths for both interior and exterior design.

The mold assemblies, which form the different types of masonry units, typically include a tamperhead component and a mold, which are driven by a special machine. A typical machine and mold assembly are typically operated under intense conditions such that the mold assembly is cycled approximately every eight to fifteen seconds, producing approximately 25-30 masonry units per cycle. Also, the machines are often run continuously, only stopping to change mold assemblies or make repairs. Although the molds may be changed more or less frequently, the machines are typically stopped two or three times a day to change the molds. Although a skilled technician may be capable of removing a mold assembly and installing a new mold assembly in the machine in approximately 30 minutes, typical mold assembly installations require significantly more time due to the need for accurate aligning of the tamperhead and the mold and calibrating the machine.

Driven by the production machinery, the tamperhead and the mold assembly function together to form and compact the concrete units in the steel cavities of the mold assembly, which form the shape and size of masonry units. After a medium, such as concrete, is poured into the mold cavities, the tamperhead specifically functions to compact the concrete in the mold cavities and then strip the individual units from the mold cavities. To accomplish this, the tamperhead is includes an upper head structure with pairs of stripper shoes and plunger assemblies.

The stripper shoes are custom designed to match with the mold cavities and fit within the inner walls of the mold cavities with only a minimal clearance. Depending on the type and size of product being manufactured, this clearance may range from about 0.2 mm to about 1.5 mm per side. If the clearance is too small, the shoe will rub against the cavity wall inducing stress in the mold and production machinery as well as premature wear. If the clearance is too big, concrete will protrude between shoe and cavity walls, forming "burrs" on top of the product which, at best, detracts from its aesthetic appeal and, at worst, creates installation problems in the field.

The stripper shoes are attached to the upper head structure by structural members referred to as the plunger assemblies. The plunger assemblies attach, typically by welding, the stripper shoes to the upper head structure in a pattern that corresponds to the pattern of mold cavities in the mold. Fabrication of the plunger assemblies traditionally includes two pieces: the backup plate and the plunger.

The plunger is commonly made of rigid length of material such as steel tubing having various cross-sectional shapes capable of providing the structural load path to compress the concrete and strip the formed concrete product from the mold. These cross-sectional shapes may be round, square, rectangle, angle, I-shaped, etc. Further, the plunger may be either solid or hollow.

Traditionally, the backup plate is welded to the plunger after the plunger has been welded to the upper head structure. The backup plate includes holes to facilitate fastening of the stripper shoe and, like with the molds and the stripper shoes, the backup plates are custom fabricated to match the stripper shoes of a specific type of masonry product.

Unfortunately, the welded construction of the two-piece plunger assembly is difficult to fabricate, susceptible to failure, and requires custom redesign for every type of masonry unit. The two-piece welded plunger assembly is costly and time consuming because each plunger assembly is custom designed to provide attachment holes for the fastening of the stripper shoe to the plunger assembly. Additionally, the weld joint between the backup plate to the plunger requires precise welding to ensure correct alignment and functionality between the stripper shoes and the mold cavities. Unfortunately, such precision welding often requires specially trained personnel and additional time and effort in preparing the components before welding.

Previous attempts to attach the stripper shoe directly to the plunger through welding have failed because of welding induced warping of the stripper shoes and the like. Furthermore, the need to precisely align the stripper shoe with the mold cavities traditionally includes tightening the fasteners between the stripper shoes and the backup plates while the stripper shoes are inserted into and aligned with the mold cavities. Additionally, the need to replace broken or damages stripper shoes without replacing the entire tamperhead has made directly welding the stripper shoes to the plunger ineffective.

Additionally, the two-piece fabrication includes a weld joint between the backup plate and the plunger, which is susceptible to failure and material fatigue. During masonry production, the mold is shaken or vibrated to compact the concrete in the molds. This vibration has been shown to induce fatigue and stress failures in the plungers and especially in the weld joints of the plunger assemblies. As a consequence, the backup plate introduces an additional weld joint which is more susceptible to failure from impact stresses or material fatigue than fastening joints, such as the joint between the between the stripper shoe and the backup plate.

Although the stripper shoes and the mold cavities must be custom designed for each type of masonry unit, the use of a custom fabricated plunger assembly for each product type is time consuming and costly. The backup plate is custom fabricated to match the bolt pattern of the stripper shoe before the backup plate is welded to the plunger. Although typically not necessary, the plunger may also need to be custom fabricated or formed from non-standard tubing to accommodate unique stripper shoe designs.

Therefore, there exists a need for a tamperhead employing a universal plunger assembly that reduces the need for custom fabrication of backup plates or plunger elements for different masonry units or product types. There also exists a need to reduce the number weld joints that are susceptible to failure between the stripper shoe and the upper head structure.

SUMMARY OF THE INVENTION

An assembly for stripping a medium from a mold cavity according to one embodiment of the present invention may include a stripper shoe, a head structure, and a plunger component attaching the stripper shoe to the head structure. The plunger component may have an elongated body, a first portion with a first end, and a second portion with a second end. The second portion may be substantially perpendicular to the first portion and have an opening configured to facilitate fastening the stripper shoe to the second portion of the plunger component.

An assembly for compacting a material and stripping the material from a mold according to another embodiment of the present invention may include a stripper shoe receivable in the mold, a head structure, and a plunger component attaching the stripper shoe to the head structure. The plunger component may include an elongated body, a first portion with a first end, and a second portion with a second end. The second portion may be substantially perpendicular to the first portion.

An assembly for compacting a material and stripping the material from a mold according to another embodiment of the present invention may include a stripper shoe receivable in the mold, a head structure, a plunger component attaching the stripper shoe to the head structure. The plunger component may include an elongated body, a first portion with a first end attached to the head structure, and a second portion with a second end. The second portion may also include an opening configured to facilitate fastening the stripper shoe to the second portion of the plunger component.

A method of attaching a stripper shoe to a head structure of an assembly for forming masonry units according to an embodiment of the present invention including the steps of forming at least one plunger component having an elongated body, a first portion with a first end, and a second portion with a second end. The second portion may include an opening configured to facilitate fastening the stripper shoe to the second portion of the plunger component. The steps may also include forming a substantially 90 degree angle between the first portion and the second portion, attaching the first end of the at least one plunger component to the head structure, and fastening the stripper shoe to the second portion of the plunger component using the opening.

BRIEF DESCRIPTION OF THE DRAWINGS

While the specification concludes with claims particularly pointing out and distinctly claiming the present invention, it may be believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION OF THE EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, many types of machines that produce products by molds, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1A:
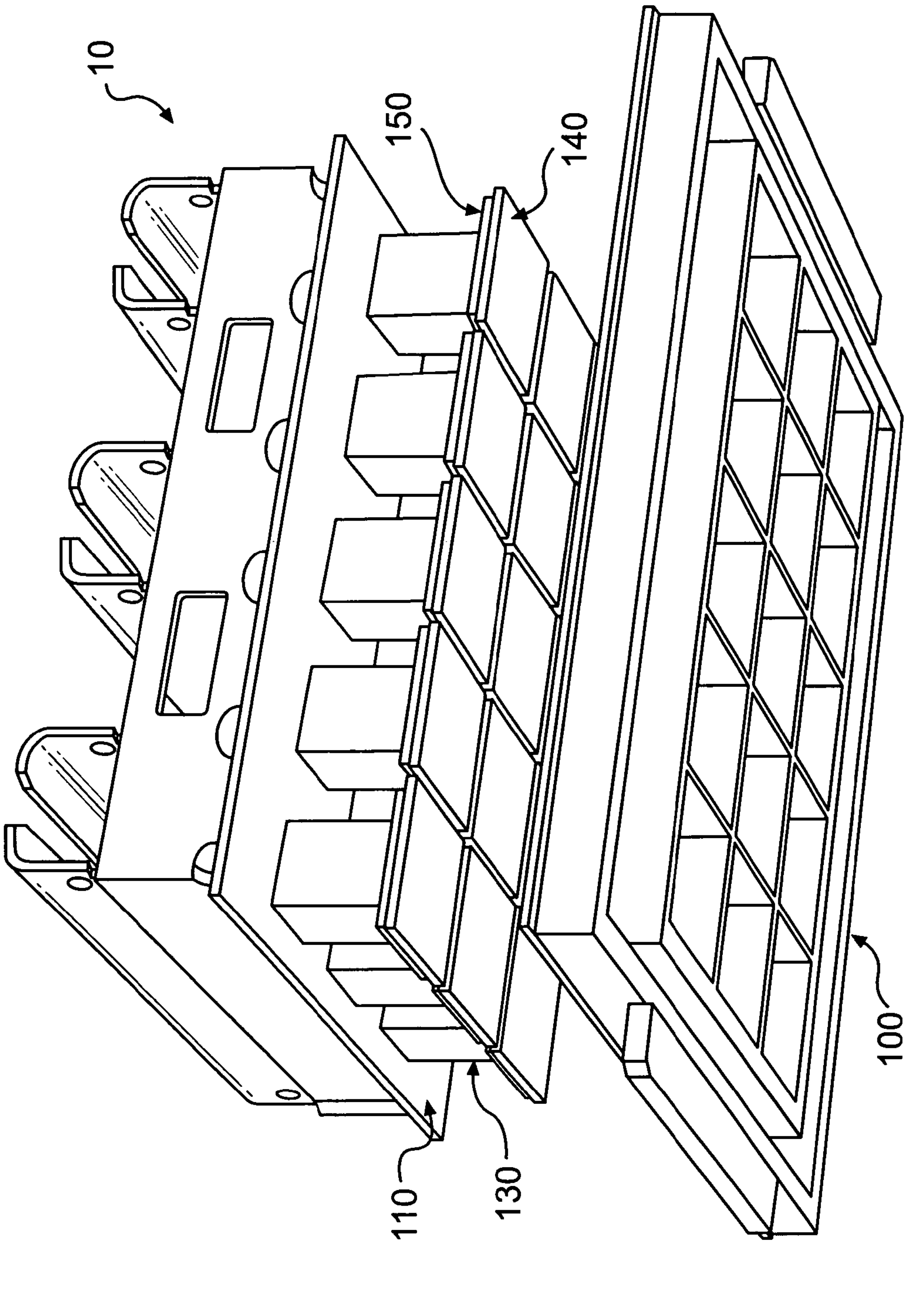
FIGS. 1A-B illustrate portions of a prior art concrete mold production assembly.
Figure 1B:
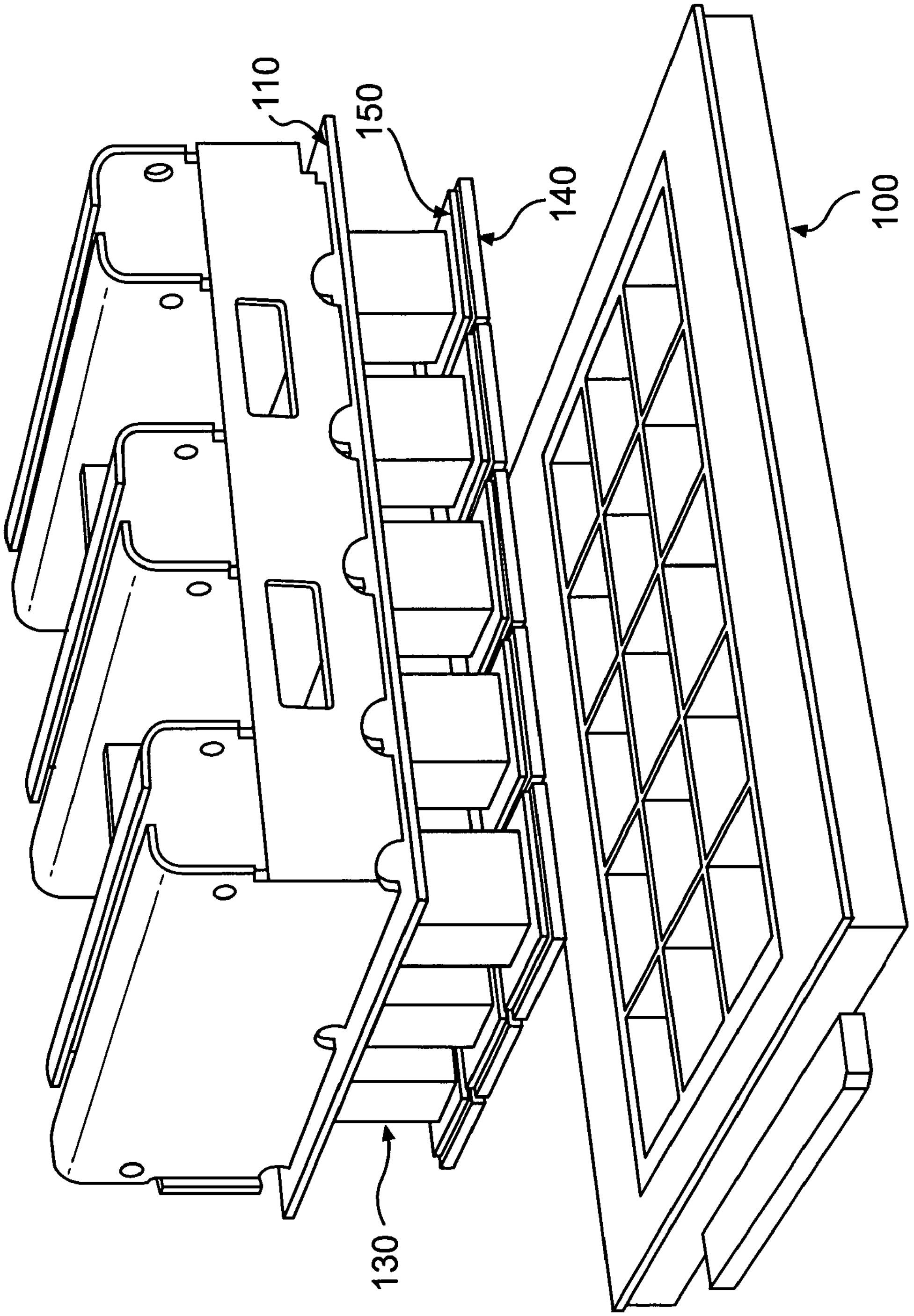

In FIGS. 1A-B, a prior art embodiment of a mold assembly 10 for forming concrete products is shown. The mold assembly 10 includes a tamperhead section having a head structure 110, a plunger 130, a backing plate 150, and a stripper shoe 140. The plunger 130 is welded to the head structure 110 and the backing plate 150. The mold assembly 10 also includes a mold 100 having a stationary frame and insert. The mold 100 includes individual molding cavities 120 which may receive concrete material from a feed drawer (not shown).

The head structure 110 is mounted on a compression beam (not shown) and is movable up and down in the vertical direction above the mold 100. A pallet (not shown), e.g. a flat rigid piece of wood, metal, or other suitable material, may be positioned against the bottom side of the mold assembly to seal the bottom of the cavities 120. A feed drawer (not shown) may be used to move concrete material over the top of the mold cavities 120 and to dispense material into the contoured cavities. The frame and insert 100 may be shaken as material is dispensed to assist in compacting the concrete and improving surface quality. After material is dispersed, the feed drawer is withdrawn and the compression beam and the head structure 110 are lowered such that the stripper shoes 140 enter the mold cavities 120.

In the production process, the mold cavities 120 hold the concrete for only about five to eight seconds during which the concrete is partially set. During each cycle, the mold 100 may be shaken. Additionally, the head structure 110 and the stripper shoes 140 may apply a downward force on the concrete material to improve compaction of the material. Although the vibrations are directly applied to the mold 100, the minimum clearance helps to transmit vibrations from the mold 100 to the stripper shoe 140, vibrations which the plunger assemblies and the entire tamperhead experiences. Finally, the mold 100 is lifted and the stripper shoes 140 force the material from the bottom of the mold cavities 120, such that the formed concrete may be removed with the pallet.

Figure 2A:
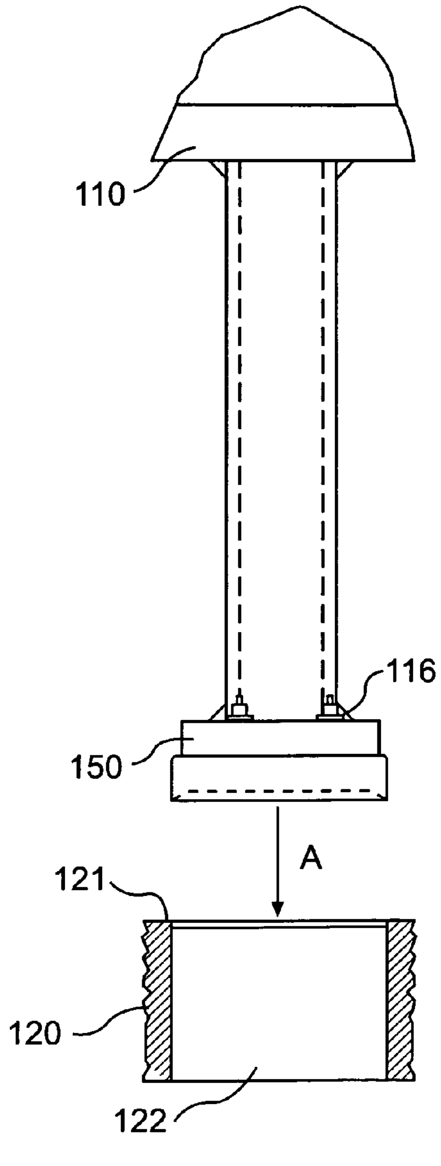
FIGS. 2A-B illustrate plunger assemblies of a prior art concrete mold production assembly.
Figure 2B:
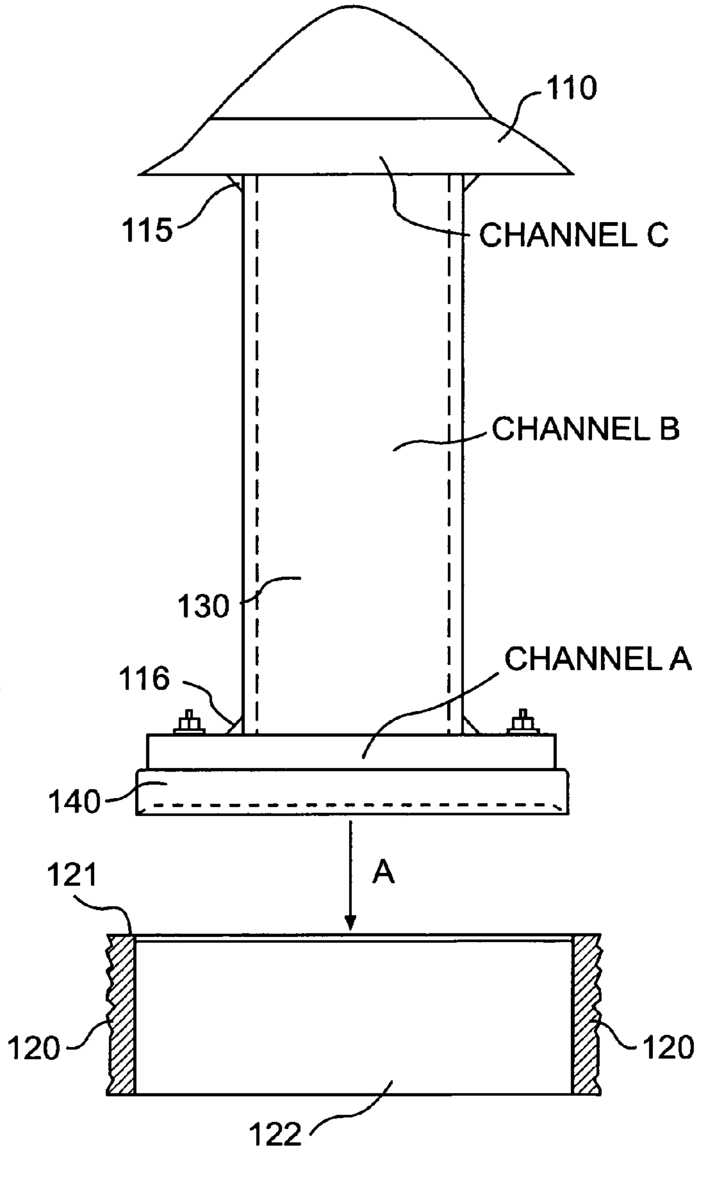

In FIGS. 2A and 2B, front and side views of a single prior art plunger 130 are shown with the plunger 130 shown in relation to a single mold cavity 120. The plunger 130 is traditionally configured for increased rigidity and decreased flexibility by selecting the stiff material properties for the plunger 130, reducing the length of the plunger 130, and increasing the thickness and/or shape of the plunger walls. It will be obvious to one of ordinary skill in the art that the length of the prior art plunger 130 needs to be sufficient in order to properly extend through and expel the formed concrete from the mold cavity 120.

As shown in FIGS. 2A and 2B, the mold cavity 120 includes a leading angle 121 on the top edge of the mold cavity 120. This leading angle 121 functions as the guiding mechanism for aligning the stripper shoe 140 within the mold cavity 120. As the stripper shoe 140 is lowered in the direction of the Arrow A in FIG. 2A, the leading angle 121, if necessary, forces the stripper shoe 140 into alignment with the cavity 122 of the mold cavity 120. Contact between the stripper shoe 140 and the leading angle 121 during lowering of the head structure 110 generates severe stresses on the plunger 130 and especially the weld joints connecting the stripper shoe 140 and the head structure 110. This alignment method demonstrates the need for precise alignment of the stripper shoes 140 on the backup plate 150 such that contact with the leading angle 121 is minimized.

Joints 115 and 116, connecting plunger 130 to the head structure 110 and the backup plate 150, in particular experience high stresses when the stripper shoe 140 is forced within the cavity 122, especially when the stripper shoe 140 initially impacts the leading angle 121 during alignment. As would be obvious to one of ordinary skill, the repeated impacts from alignment are particularly difficult on weld joints, resulting in failure due to stress fractures and material fatigue. Further, the impact between the stripper shoe 140 and the leading angle 121 also results in increase wear and deterioration of the stripper shoes 140 and the mold cavities 120.

Figure 3A:
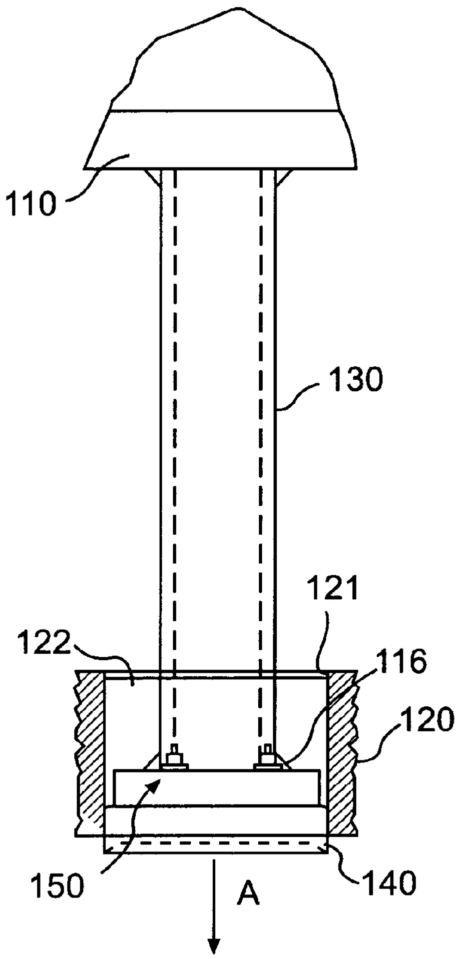
FIGS. 3A-B illustrate plunger assemblies of a prior art concrete mold production assembly.
Figure 3B:
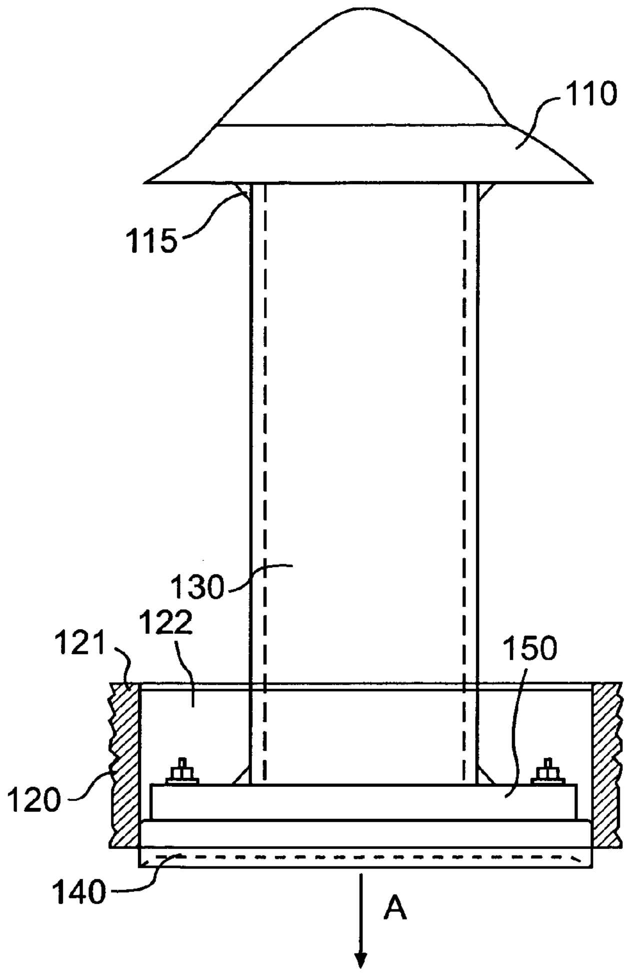

In FIGS. 3A and 3B, front and side view of the stripper shoe 140 are shown with the stripper shoe aligned and positioned within the mold cavity 120 such that a formed concrete unit would be stripped and removed from the mold cavity 120. The clearance between the stripper shoe 140 and mold cavity 120 is minimal, approximately 0.2 mm to approximately 1.5 mm. This minimal clearance is required so that the stripper shoe 140 can effectively strip concrete from the walls of the mold cavity 120 as the stripper shoe 140 is pushed through the mold cavity 120 as shown in FIGS. 3A-B without leaving excess concrete material clinging to the walls of the mold cavity 120. Unfortunately, this minimal clearance also contributes to the transmission of vibrational forces from the mold cavity 120 to the stripper shoe 140. Again, the tight clearance further highlights the need for precision spacing between the stripper shoes 140 to avoid binding and interference between stripper shoes 140 and with the mold cavities 120 during production.

Figure 4A:
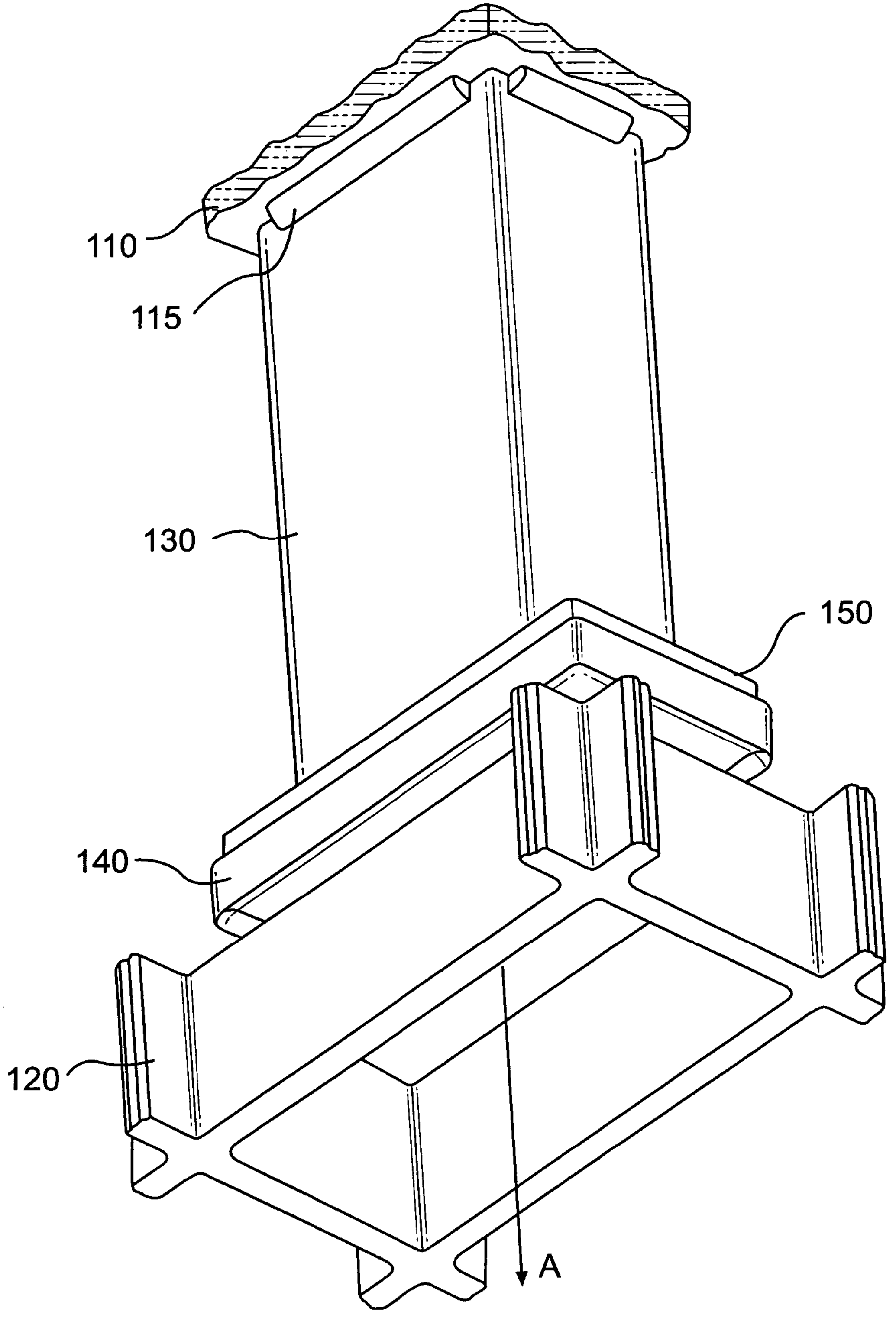
FIGS. 4A-C illustrate perspective views of a prior art plunger assembly of a concrete mold production assembly.
Figure 4B:
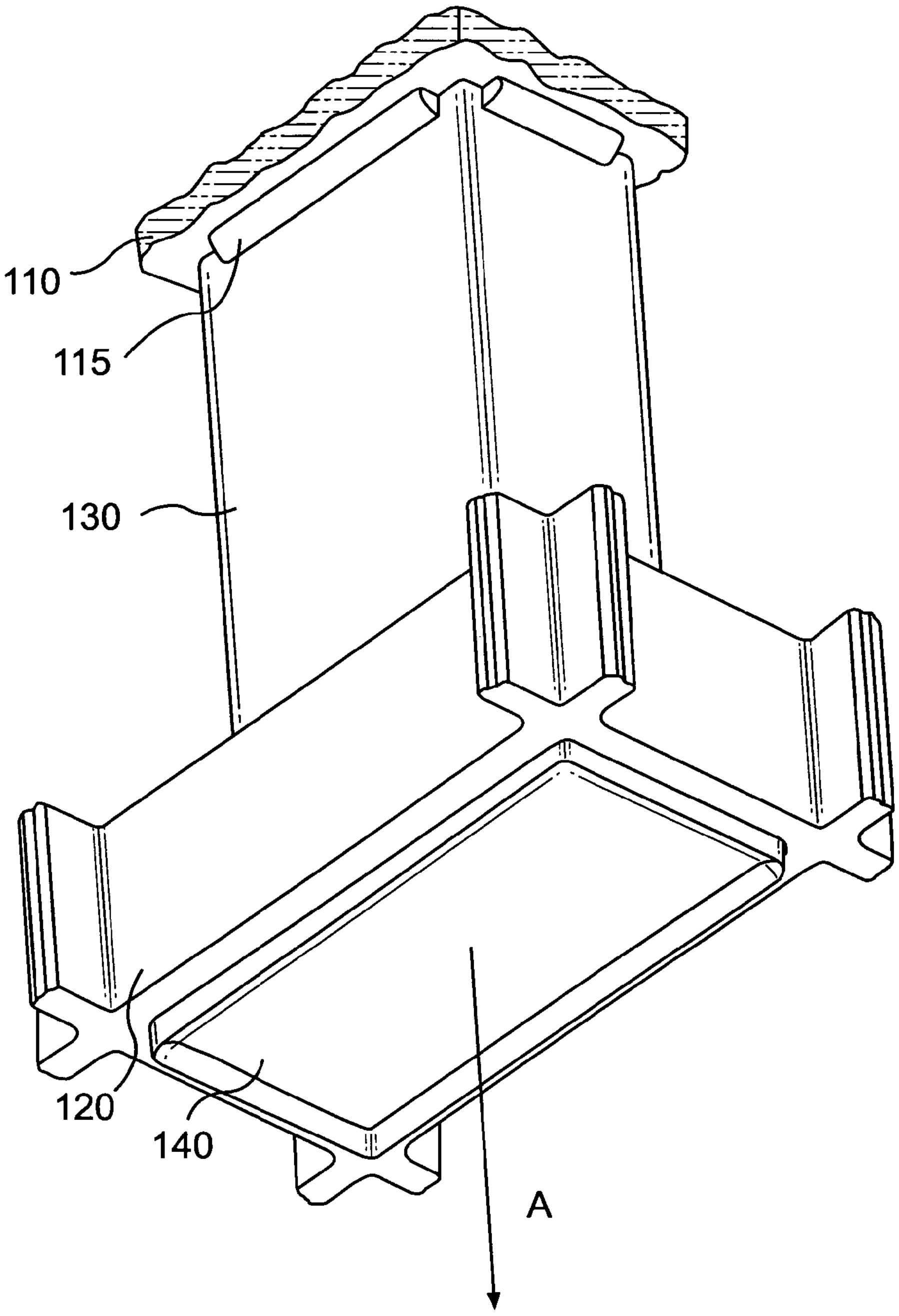
Figure 4C:
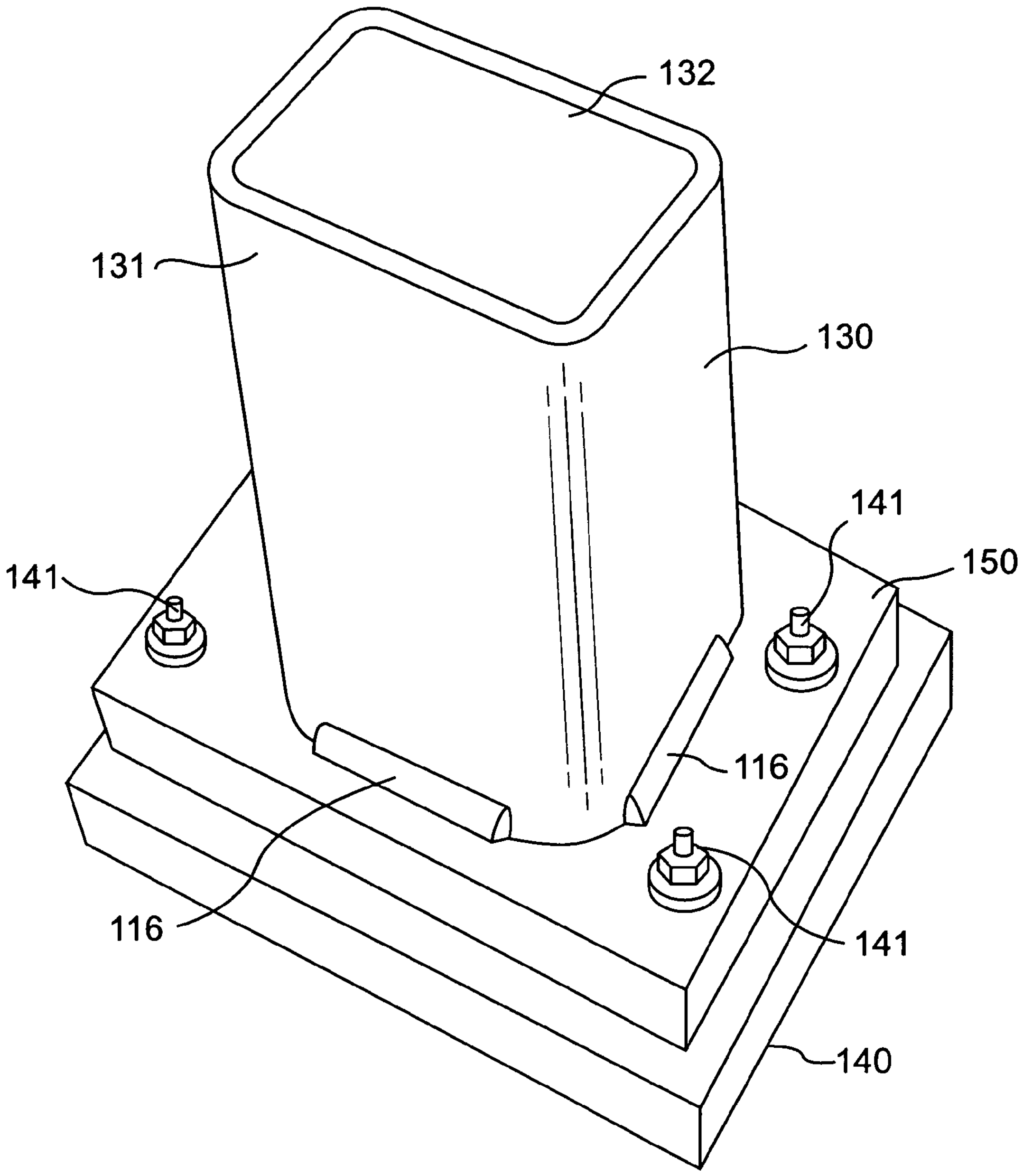

Referring to FIGS. 4A and 4B, perspective views of the traditional plungers 130 are shown. Traditional plungers are conventionally constructed from inflexible blocks or tubes of steel, alloy or other metallic material as shown in FIGS. 2A-4C. The plunger 130 may be welded to the upper head structure 110 as shown with a weld joint 115 and to the backup plate 150 with a weld joint 116. It should be obvious to one of ordinary skill that, due to the size and the configuration of the plunger 130, the plunger 130 is traditionally welded only along the outside surface 131, or the outside circumference of the plunger 130 where it meets the upper head structure 110. Weld joints 116 are likewise only along the outside circumference of the plunger 130 where it meets the backup plate 150. As shown in FIG. 4C, where the traditional plunger 130 includes a tube structure, it should be noted that the weld joints do not include the inside surface 132, or the inside circumference of the plunger 130.

Figure 5:
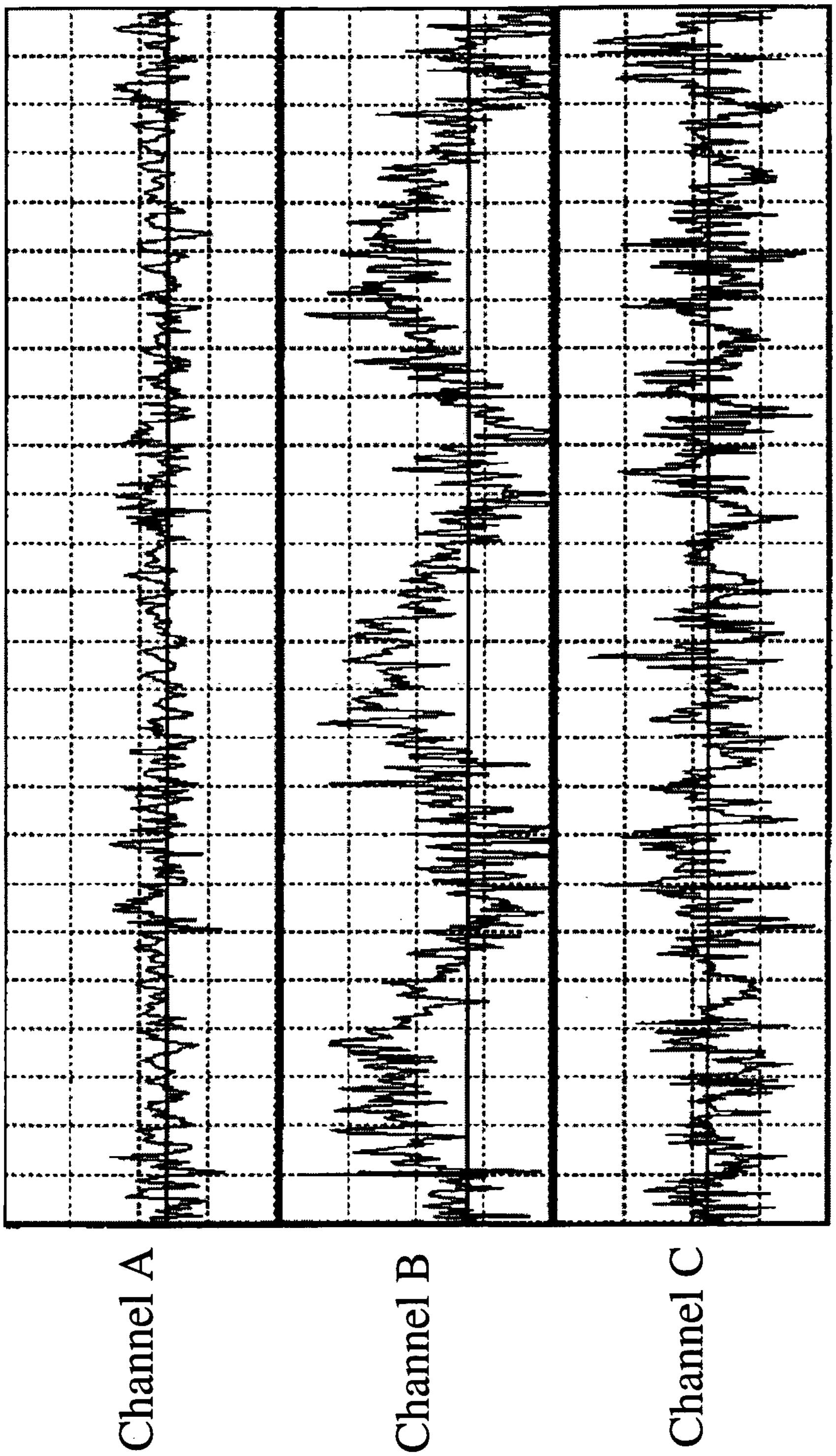
FIG. 5 illustrates vibrational test data associated with a prior art plunger.

Unfortunately, it has been shown that traditional plungers welded as shown in FIGS. 2A-4C frequently fail under exposure to impact stresses and vibrational forces. Referring to FIG. 5, the test results of a vibration simulation of a traditionally welded backup plate and plunger with a vibrator fastened to the backup plate. FIG. 5 illustrates the transmission of these vibrations from the stripper shoe to the head structure in a simulated vibration test on a conventional plunger. Vibration sensors recorded the amount of vibration at three locations (approximately located as indicated as shown in FIG. 2B): the vibrator (channel A), the middle of the plunger (channel B), and the head structure (channel C).

In the simulation, a traditional plunger was welded to a first plate representing the head structure at one end and second plate representing the backup plate at the other end. A vibrator was bolted to the second plate and used to simulate the vibrations experienced during compaction when the mold 100 is vibrated. In the vibration testing, the vibrator induced vibrations having a frequency of 50 Hz with an amplitude of 2.5 mm.

The test results of FIG. 5 show significant transmission of induced vibration on channel A through to the plunger on channel B and to the head structure on channel C. The traditional plunger used in the testing included a steel 2"×4" tube with ¼ inch wall thickness with a length of 200 mm. The traditional plunger was welded to the backup plate and the upper head structure as shown and described in reference to FIGS. 2A-4C. Failure of the traditional plunger occurred after 30 minutes with a crack starting in a crater of the welding between the plunger and the upper head structure, a typical type of failure occurring in the field.

Referring back to FIG. 4C, the backup plate 150 is sized and configured to match the bolt pattern of bolts 141. To accomplish this, the backup plate 150 is custom fabricated and then welded to the plunger 130. In FIG. 4C, the stripper shoe 140 is shown in the traditional square shape with four bolts 141 (one bolt is not visible in the figure). As a consequence, the backup plate 150 is sized to match the traditional square shape of the stripper shoe 140 and includes four bolt holes to receive the bolts 141. It should be obvious to one of ordinary skill, if the shape or bolt pattern of the stripper shoe 140 changes, the backup plate 150 must change to match. Further, if the stripper shoe 140 is significantly reduced in size, the plunger 130 may need to be resized to ensure that no part of the plunger 130 extends beyond the stripper shoe 140.

Contrary to the accepted prior art, embodiments of the present invention may include utilizing one or more universal plunger components to attach the stripper shoe to the upper head structure without customizing a different backup plate for different stripper shoe designs. According to the present invention, the universal flexible plungers may be less susceptible to vibration-induced forces, material fatigue, and high stresses from alignment impacts because the universal plunger components may fasten, as opposed to welding, the stripper shoe to the plunger. Additionally, the weld between the plunger and the upper head structure may be directly welded on both sides of the bar. The universal plunger may also function without the use of a backup plate and its additional weight, making the production machinery less expensive to run and the plunger less expensive to fabricate.

Figure 6:
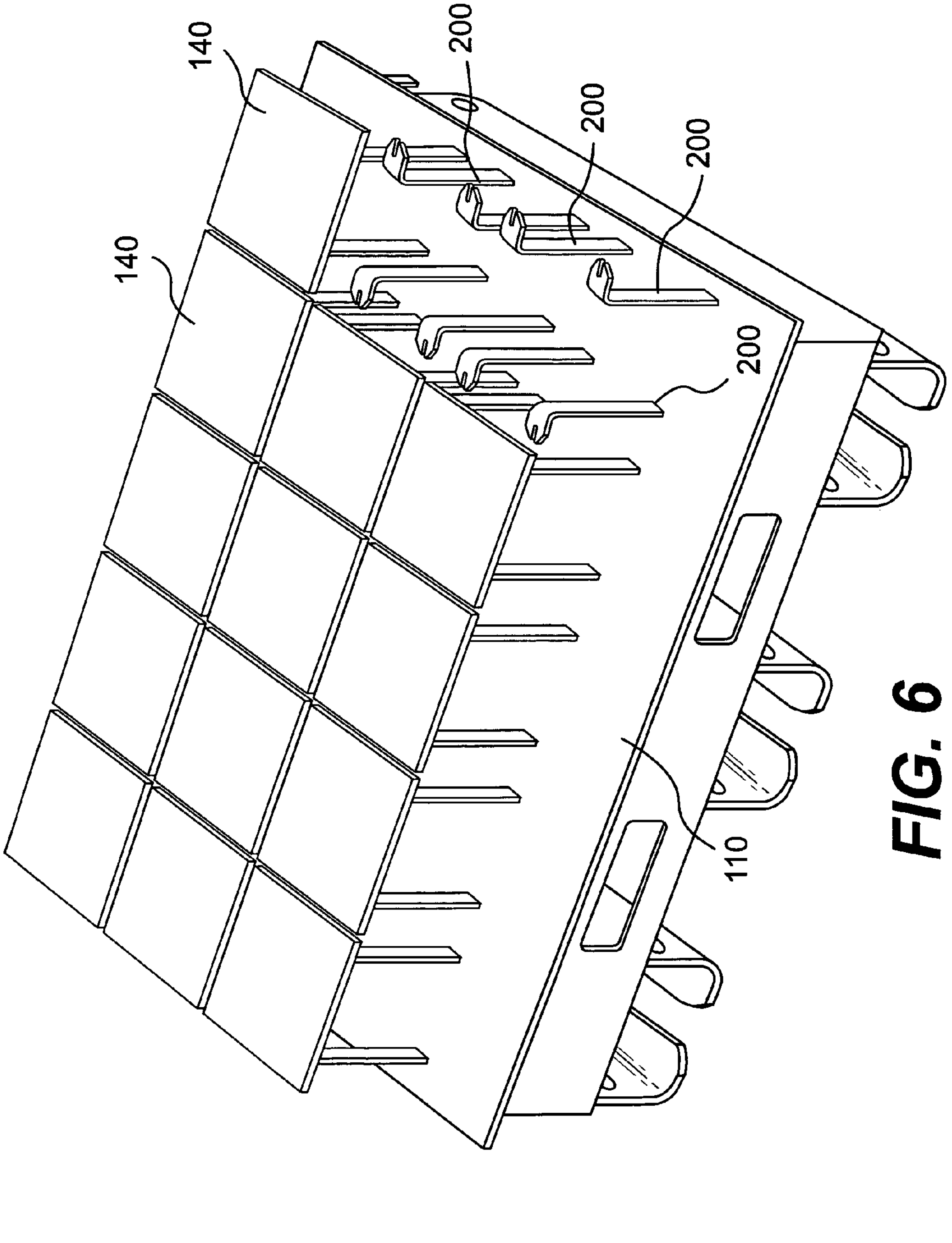
FIG. 6 illustrates a tamperhead incorporating a universal plunger in accordance with an embodiment of the present invention.

Referring now to FIG. 6, one embodiment of the present invention is shown in a perspective view of the bottom of the tamperhead. In this embodiment, the stripper shoes 140 may be attached to the upper head structure 110 using plunger components 200. As shown, four plunger components 200 connect each of the stripper shoes 140 to the head structure 110. The plunger components are "L" shaped plunger elements may be configured on and attached to the upper head structure 110 such that each plunger component 200 corresponds to a fastening means on the stripper shoe 140. For example, in FIG. 6, the four plunger components 200 are arranged and welded on the upper head structure 110 such that each plunger components 200 attach to a bolt on the stripper shoe 140 in a consistent pattern, such that the plunger component pattern on the upper head structure 110 matches the bolt pattern dictated by the stripper shoe 140.

Figure 7:
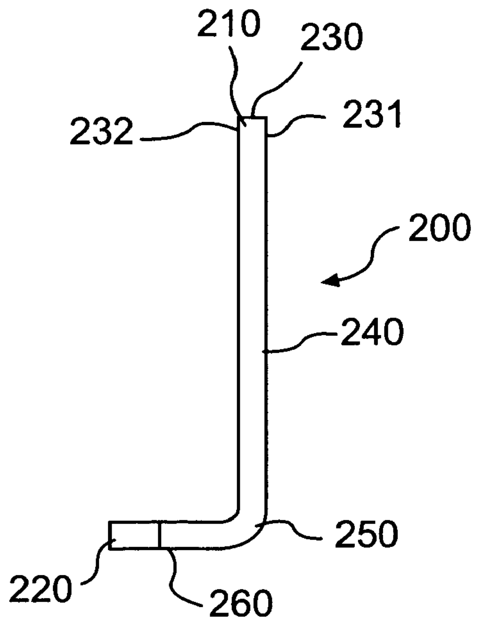
FIG. 7 illustrates a side view of a plunger component in accordance with an embodiment of the present invention.

In FIG. 7, a side view of the plunger component 200 is shown. The plunger component 200 comprises an "L" shaped plunger element generally fabricated from a metal flat bar. The plunger component includes a first end 210 and a second end 220. The first end 210 includes an upper surface 230 which may be welded to the upper head structure 110 as shown in FIG. 6. Between the first end 210 and the second end 220, the plunger component 200 includes a body section 240 as shown, which may provide length and axial stiffness to the plunger component 200.

As shown in FIG. 7, the second end 220 of the plunger component 200 is bent at a substantially 90 degree angle 250. The bend 250 defines the beginning of the surface 260 which extends to the end 220 and may be substantially perpendicular to the body section 240. When the plunger, stripper shoe, and upper head structure are assembled, the surface 260 substantially abuts the stripper shoe 140.

Figure 8:
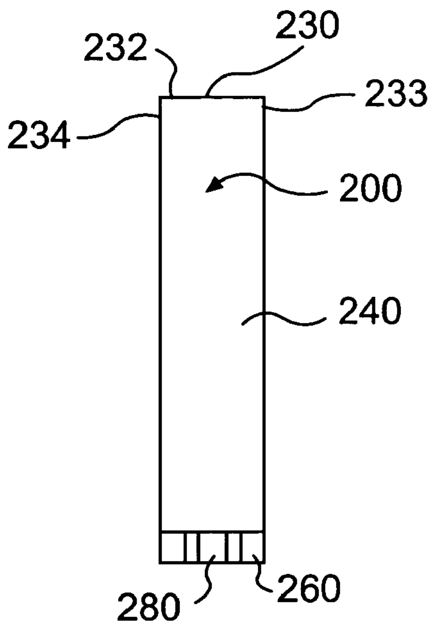
FIG. 8 illustrates a front view of a plunger component in accordance with an embodiment of the present invention.
Figure 9:
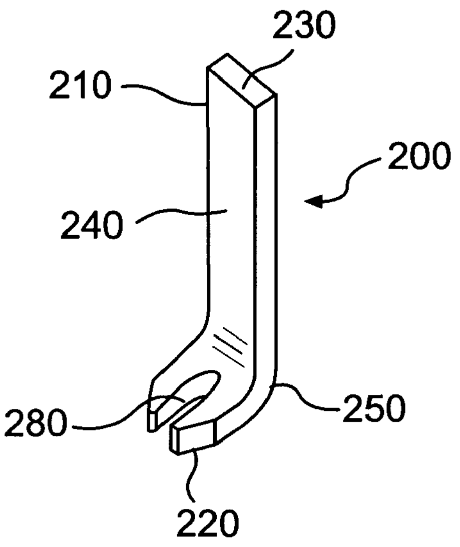
FIG. 9 illustrates a perspective view of a plunger component in accordance with an embodiment of the present invention.

In FIGS. 8 and 9, a front view and a perspective view of the plunger component 200 are shown respectively. Below the bend 250, the second end 220 may include a slot 280 to facilitate the fastening of the stripper shoe to the second end 220 of the plunger component 200. The slot 280 may be capable of receiving a bolt and nut (not shown in FIGS. 8 and 9) for fastening the stripper shoe 140 directly to the plunger component 200. Other fastening means, know to those of skill in the art, may be used to fasten the stripper shoe to the plunger component without deviating from the scope and spirit of the present invention.

In FIG. 9, the perspective view of the plunger component 200 is shown illustrating the slot 280 and the "L" shape of the plunger component 200. It should be noted that the slot 280 allows the plunger component 200 to work with all product shapes without the need for custom design of individual plungers. For example, if a stripper shoe includes a three-bolt pattern for fastening the stripper shoe to a traditional backup plate, three plunger components 200 as shown in FIG. 9 may be arranged on the upper head structure according to the three-bolt pattern with no additional custom design work. By aligning the slots 280 from the three plunger components 200, the stripper shoe may be directly mounted on the plunger components 200, making the use of a custom designed, and heavy backup plate unnecessary. Further, the three plunger components, sans the backup plate, may be lighter, require less assembly time, have fewer weld joints, and overall be more cost efficient to fabricate due to the identical nature of the plunger components 200.

Although the second end 220 of the plunger component in FIG. 9 is shown with the slot 280, the second end 220 may be alternatively shaped and/or configured to fasten to a stripper shoe 140 or backup plate 150. For example, it would be obvious to one of ordinary skill that the second end 220 may include multiple slots or even a simple hole for providing an attachment means between the stripper shoe 140 and the plunger component 200.

The plunger component 200 may be welded around the perimeter of the first end 210 to the upper head structure 110. In FIGS. 7 and 8, the surfaces 231-234 are shown. These surfaces 231-234 are include in the weld joint 215 in FIG. 10A, where the weld joint 215 surrounds the perimeter of the first end 210. In comparison to the traditional plunger shown in FIG. 4C, the plunger component 200 does not include an inner surface 132 that is not welded to the upper head structure 110.

Referring back to FIG. 6, the top surface 230 of the plunger component 200 is welded or fastened to the head structure 110 such that the surface 260 is adjacent to the stripper shoe 140. However, the plunger component 200 may be flipped such that the surface 260 is secured to the head structure 110 by fasteners and the top surface 230 to the backing plate 150 or stripper shoe 140. Although not shown in FIG. 6-9, the plunger component 200 may also include cutouts in the body 240 to induce flexibility and/or adjust the stiffness of the plunger component 200.

Although, the backup plate has been removed in the embodiment shown in FIGS. 6-9, it should be understood that the plunger components 200 may be used with a back plate 150 if necessary or desired. By including a fastening means on a backup plate or directly welding the backup plate to the plunger component 200, the use of a traditional backup plate 150 may be used with the plunger components 200.

It should be obvious to one of ordinary skill that the pattern of plunger components may be rearranged and spaced on the upper head structure 110 in different patterns to accommodate the different types of stripper shoes 140 and/or different bolt patterns on stripper shoes 140 without redesigning the individual plunger components 200. Furthermore, while the number of plunger components used in FIG. 6 is four, the number of plunger components may be more or less without deviating from the true scope and spirit of the present invention.

Figure 10A:
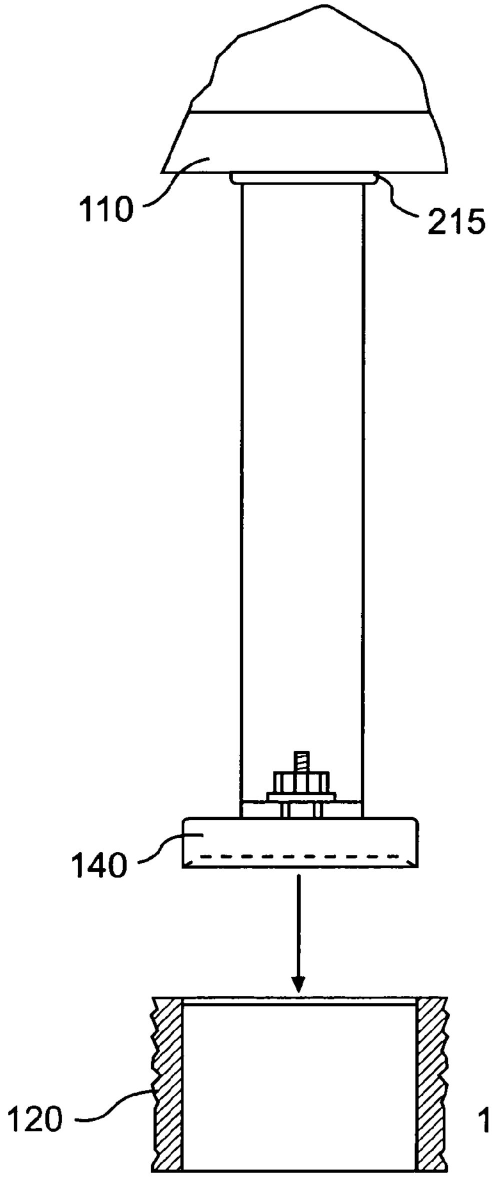
FIGS. 10A-B illustrate a universal plunger and stripper shoe in accordance with an embodiment of the present invention.
Figure 10B:
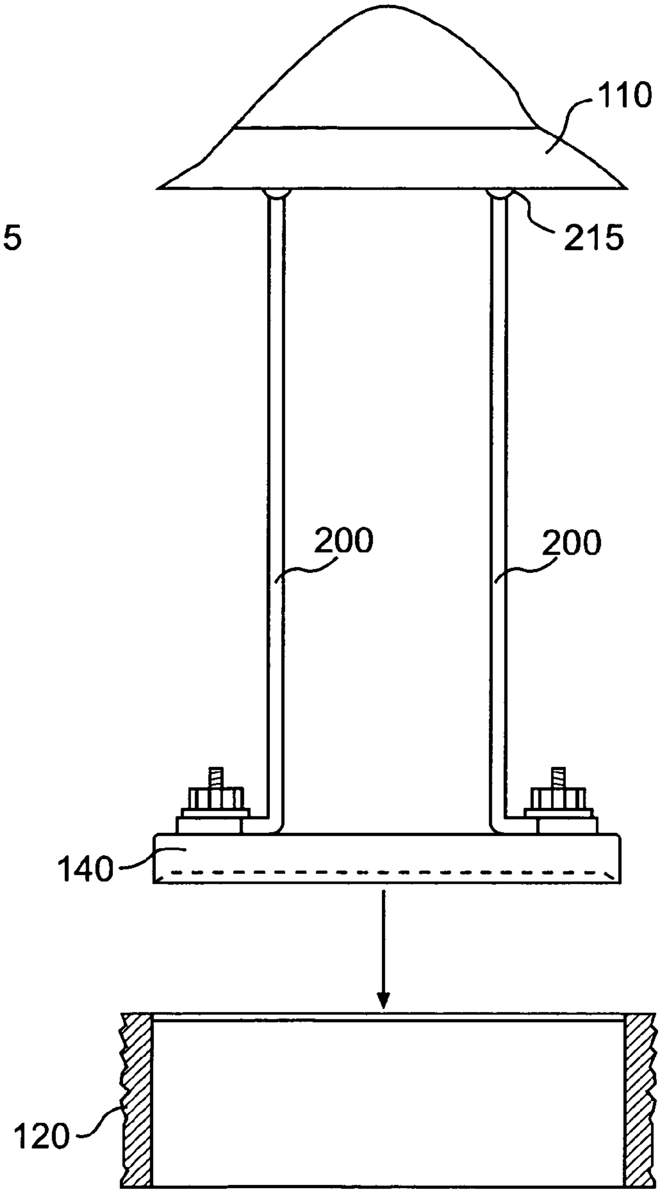

FIGS. 10A-12B demonstrate another embodiment of the present invention that employs two plunger components to connect the stripper shoe 140 to the upper head structure 110. In FIGS. 10A and 10B, side and front views of the universal plunger are shown attaching the stripper shoe 140 to the upper head structure 110 by two plunger components 200. As shown in FIG. 10 B, two plunger components 200 are welded to the upper head structure 110 with weld joints 215.

The "L" shape of the plunger components 200 may be seen in FIG. 10B such that the surface 260 of the plunger components 200 is adjacent to the stripper shoe 130. Further, the bolts 141 can be seen extending from the stripper shoe 140 and fastened to the second end 220 of the plunger components 200. Similar to the traditional plunger 130 shown in FIGS. 2A and 2B, the stripper shoe 140 is positioned and aligned with the mold cavities 120 by the plunger components 200.

Figure 11B:
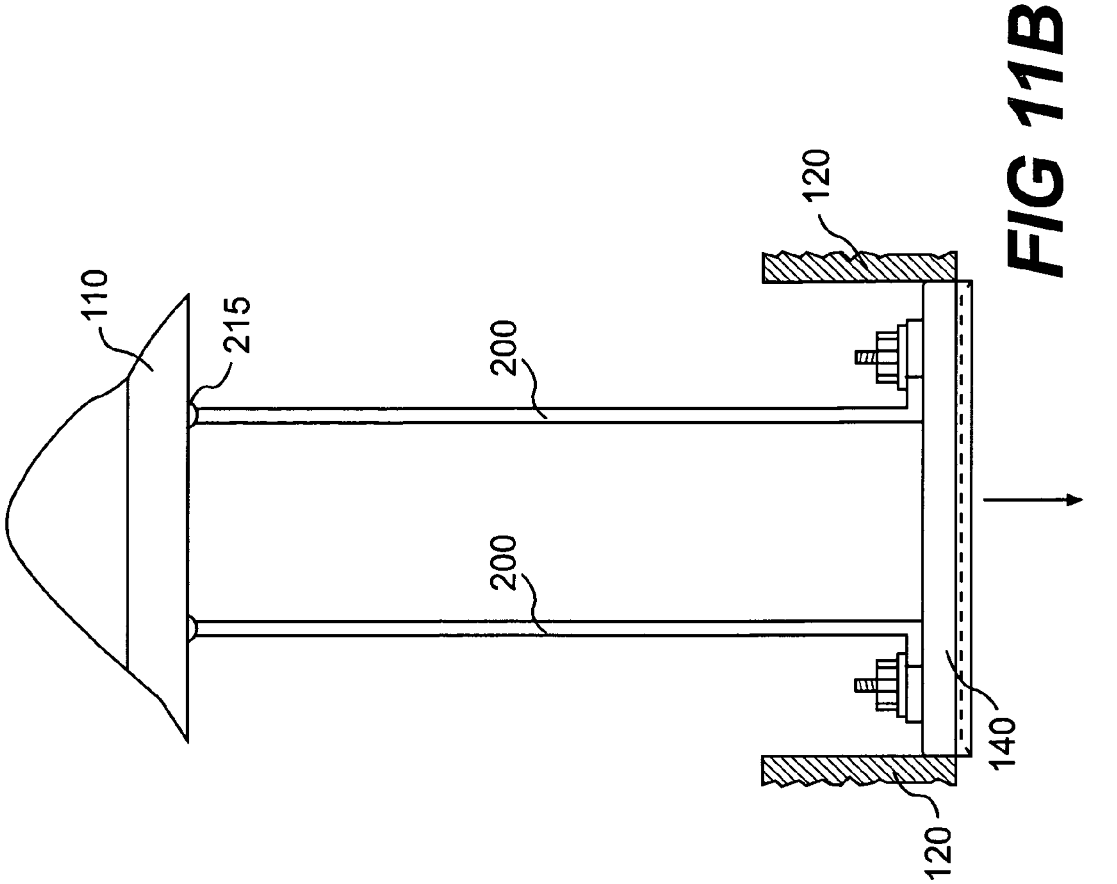
FIGS. 11A-B illustrate a universal plunger and stripper shoe in accordance with an embodiment of the present invention.
Figure 11A:
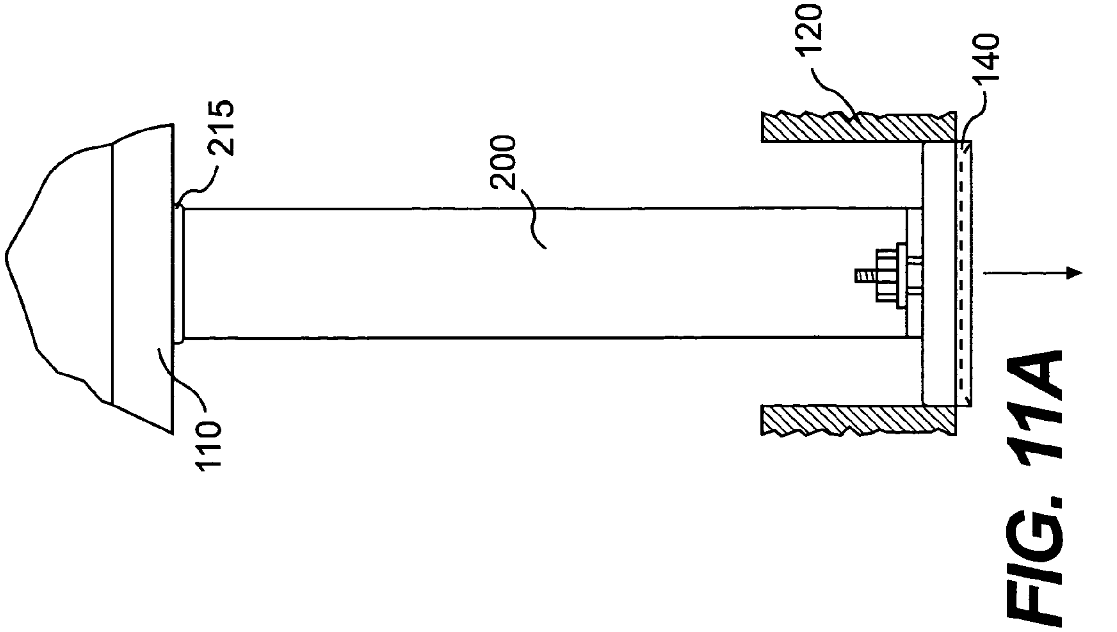

In FIGS. 11A and 11B, side and front views of the plunger components 200 are shown after a concrete unit has been stripped from the mold cavity 120. Due to the rectangular shape and size of the stripper shoe 140 shown in FIGS. 11A and 11B, only two plunger components 200 are necessary to support the stripper shoe 140 as shown in FIGS. 11A and 11B. However, it should be obvious to one of ordinary skill that if the stripper shoe 140 included a different shape or bolt pattern, such as the stripper shoe 140 shown in FIG. 6, the number and placement of the plunger components 200 may be changed simply by including and positioning additional plunger components 200 corresponding to the bolt pattern on the stripper shoe 140.

Figure 12A:
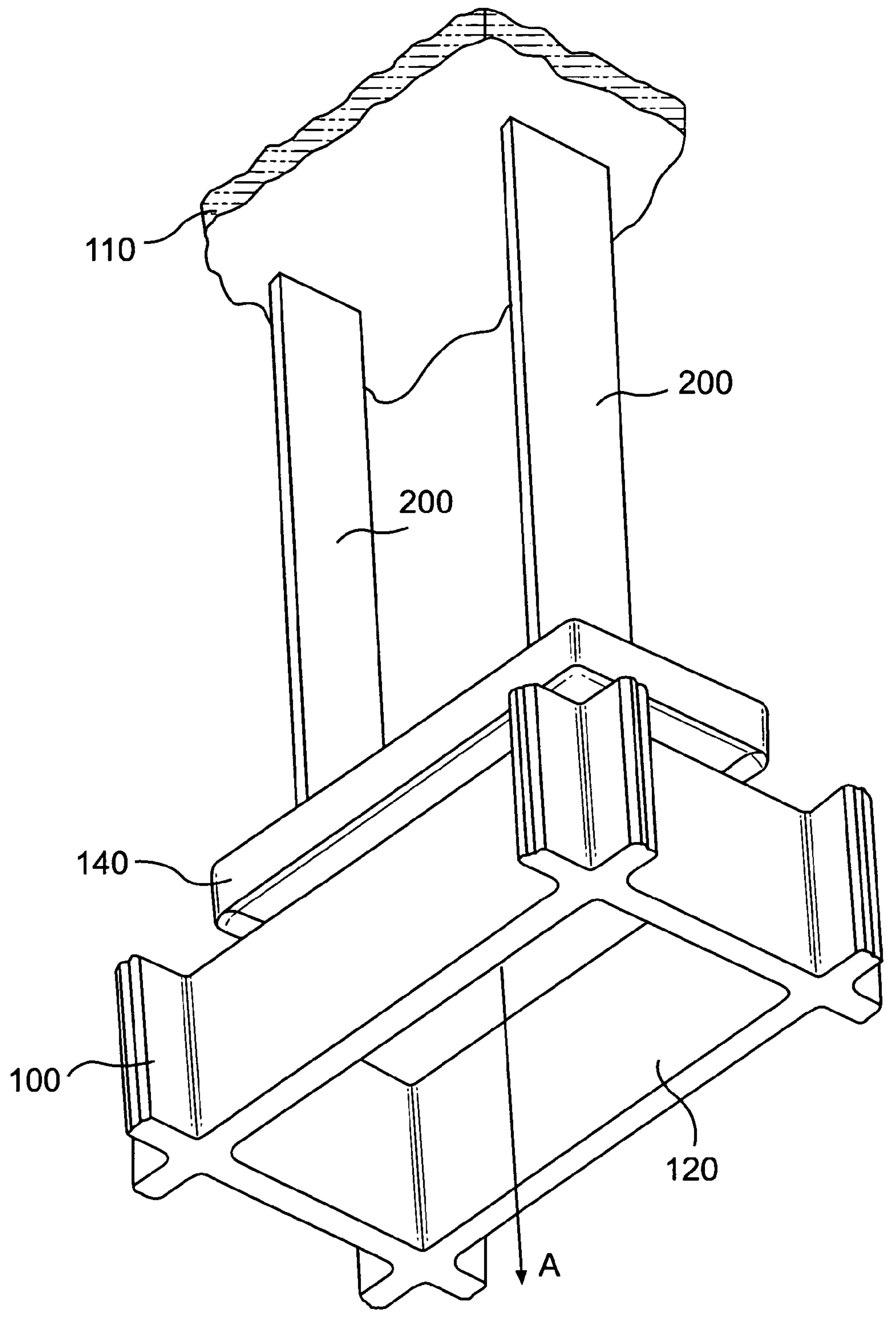
FIGS. 12A-B illustrate a universal plunger and stripper shoe in accordance with an embodiment of the present invention.
Figure 12B:
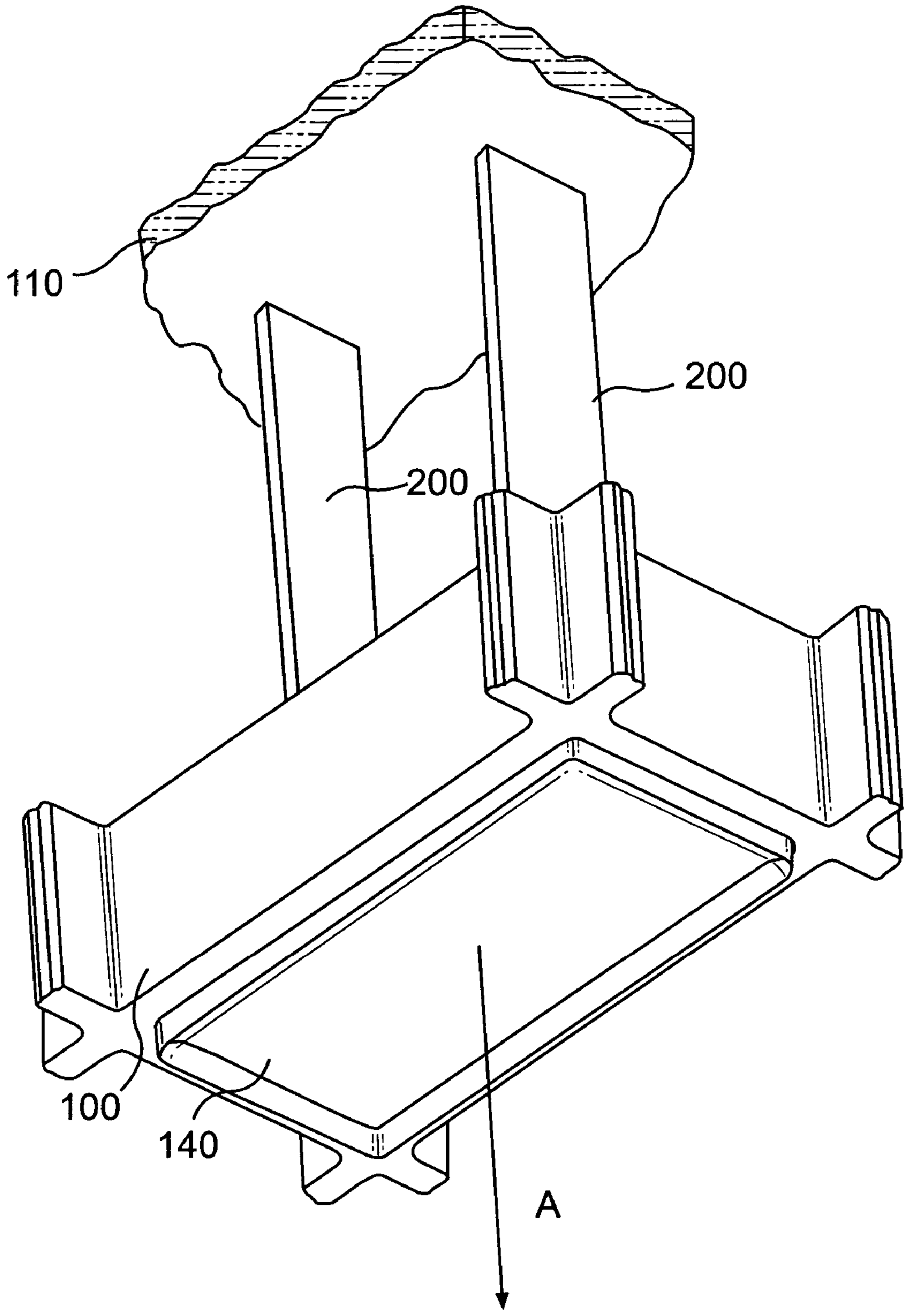

In FIGS. 12A and 12B, perspective views of the plunger components 200 are shown. It should be noted that the absence of the backup plate may function to reduce cost and construction time and increase endurance of the plunger components 200 and weld joints 215. First, the lack of a backup plate reduces the weight that may be cantilevered on the plunger components 200. By reducing the weight, the overall natural frequency of the combination of plunger components 200 and stripper shoe 140 may be increased while the magnitude of forces transmitted to the joints 215 may be minimized. Furthermore, higher the natural frequencies may be less likely to become an issue during vibrations of the mold cavities 120 for filling and compaction. Higher natural frequencies are less likely to generate destructive resonance in the tamperhead or stripper shoe/plunger assemblies.

The plunger components 200 may improve the product surface quality using a troweling action induced by the flexibility of the plunger components 200. Similar to hand troweling concrete, the motion of the stripper shoe 140 on the surface of the concrete during vibrations agitates the concrete. As a result, the fine particulate comes to the surface and the heavier aggregate moves away from the exterior of the molded product. When the concrete sets, the finer particulate on the surface of the concrete unit forms a high qualify surface, which is not produced with the traditional plunger.

The plunger components 200 may also allow the stripper shoe 140 to release trapped air and to maintain surface contact with the concrete during production, further improving the surface quality of the finished product. During production, air may get trapped between the surface of the stripper shoe 140 and the surface of the concrete, resulting in a rough finish for the end product. However, due to the additional flexibility of the plunger components 200, the stripper shoe 140 experiences sufficient motion during vibrations and the production cycle that the seal around the stripper shoe 140 and the mold cavity may be broken. This allows the trapped air to escape and the surface of the stripper shoe 140 to remain in contact with the concrete during production.

Figure 13:
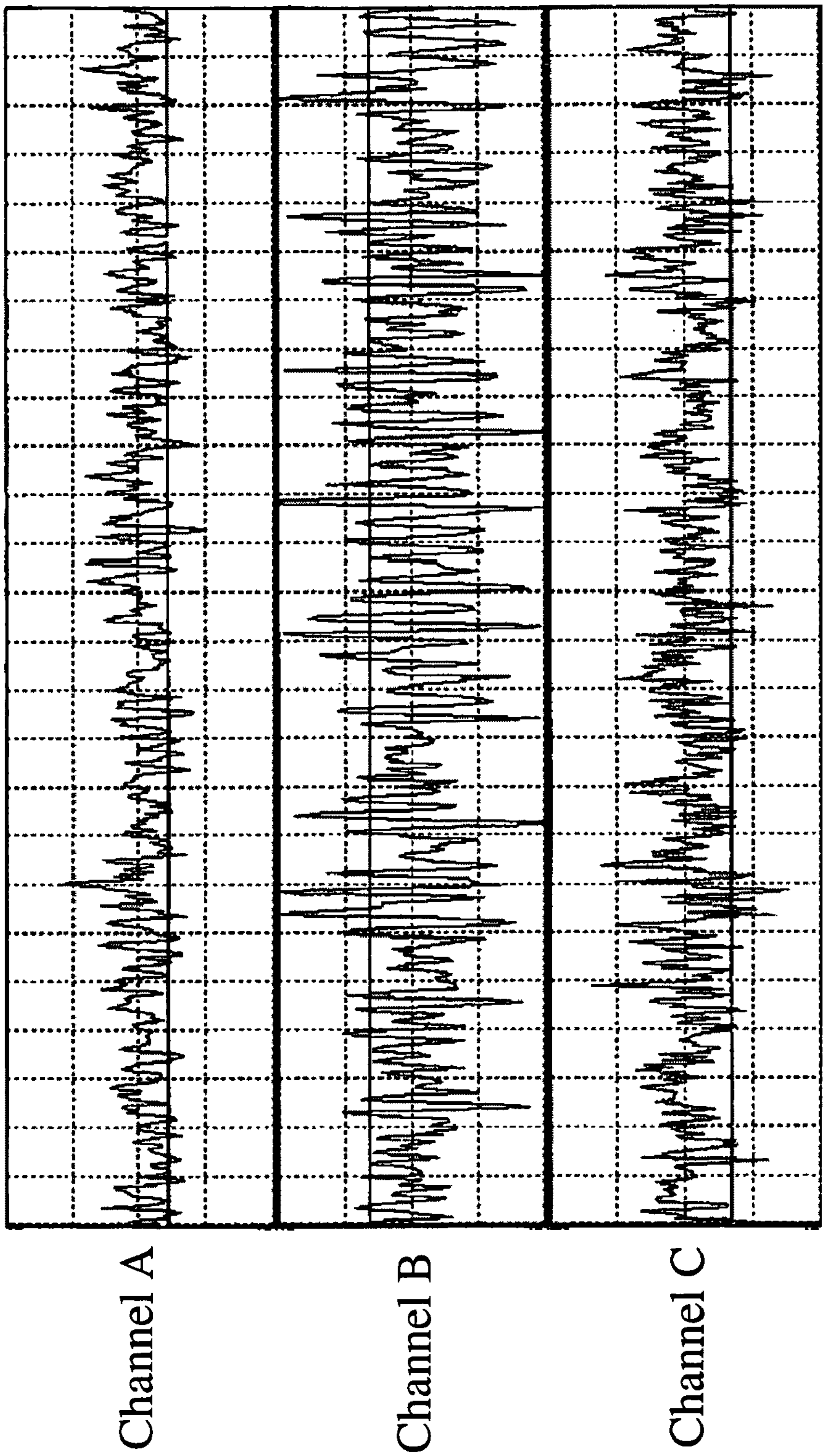
FIG. 13 illustrates vibrational test data associated with a universal plunger component in accordance with an embodiment of the present invention.

In FIG. 13, vibration test results are shown for an embodiment of a plunger component 200 which was tested under the same conditions used in the traditional plunger test results shown in FIG. 5. The plunger component used during the testing included a metal flat bar bent 90 degrees at one end to form a substantial "L" shaped plunger with a body length of 205 mm. The short dimension of the "L", along the surface 260 in FIG. 7, was 50 mm. The plunger component included a slot at one end for fastening the plunger to a stripper shoe (refer to FIGS. 7-9). Contrary to the traditional plunger, which could only be welded on one side of the plunger tube wall without any welding on the inside of the tube, the first end of the plunger component was directly welded on both the front and back sides of the flat bar to the plate representing the head structure.

In comparison, the traditional plunger test results shown in FIG. 5 and the plunger component test results shown in FIG. 13 do not indicate any significant reduction or dampening of vibrations on the three channels recorded. Despite this, while the traditional plunger failed under test conditions in 30 minutes, the "L" shaped plunger only failed after 72 hours of testing. The test results indicate that the fastener connection between the stripper shoe and the plunger component and the welding configuration between the plunger component and the upper head structure may result in prolonged plunger and weld life.

As shown in the embodiments of the present invention and the test data on the plunger component, the plunger components 200 are more efficient and cost effective than the traditional plunger. The use of the slot 280 provides a quick and secure connection which is less prone to stress failures induced by material fatigue, resulting in fewer tamper head repairs and replacements due to weld joints between the traditional plunger and the backup plate. Furthermore, the plunger components 200 act as both plungers and fastening devices while being simple and inexpensive to fabricate. Plunger components 200 may be mass produced and usable with any stripper shoe for any product unit, regardless of its configuration.

Likewise, the lack of any need to custom design plungers and backup plates further reduces the cost and difficulty of construction, especially reducing the amount of welding necessary to secure the stripper shoe to the upper head structure. By reducing weld joints, the plunger components 200 are more efficient and cost effective as plungers because of the reduction in the replacement time of broken or damaged plungers, increase in the lifespan of tamperheads, and increase in running time for production machinery.

Other materials may be substituted for the typical steel or metal alloys used in prior art plungers. For example, plastics, composites, wood, rubber and/or urethane may be used as material for the plunger. It is also contemplated that non-isotropic materials may be employed to adjust and control the stiffness and flexibility along specific axes of a plunger. Further, a plunger may undergo mechanical, heat, and/or chemical treatment to adjust the stiffness of a plunger. For example, a conventional plunger made from typical steel may be annealed at a given temperature for a period of time to induce a desired flexibility in the steel.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

The invention claimed is:

1. An assembly for stripping a medium from a mold cavity, said assembly comprising:
- a stripper shoe;
- a head structure; and
- a plunger component attaching the stripper shoe to the head structure, the plunger component comprising a metal bar having an elongated body with a first portion with a first end and a second portion with a second end, wherein the bar is bent such that the second portion defines a curved flange that extends in a substantially perpendicular manner with respect to the first portion;

wherein the first portion is fastened to the head structure;

wherein the second portion has an opening configured to facilitate fastening the stripper shoe to the second portion of the plunger component; and wherein the stripper shoe is detachably connectible to the opening of the second portion.

2. The assembly according to claim 1, wherein the opening of the second portion includes a slot.

3. The assembly according to claim 1, wherein the stripper shoe includes a bolt for fastening the stripper shoe to the second portion of the plunger component and wherein the opening of the second portion is configured to receive the bolt.

4. The assembly according to claim 1, wherein the first end of the plunger component is attached to the head structure by welding.

5. The assembly according to claim 4, wherein said metal bar comprises a solid bar having a first side and a second side and wherein the first end of the plunger component is welded along the first side and the second side.

6. An assembly for compacting a material and stripping the material from a mold, said assembly comprising:

a stripper shoe receivable in the mold;

a head structure; and a plunger component attaching the stripper shoe to the head structure, the plunger component comprising a metal bar having an elongated body, a first portion with a first end and a second portion with a second end, wherein the first portion is fastened to the head structure, and wherein the second portion is bent such that the second portion defines a curved flange that extends in a substantially perpendicular manner with respect to the first portion;

wherein the second portion has an opening configured to facilitate fastening the stripper shoe to the second portion of the plunger component; and wherein the stripper shoe is detachably connectible to the opening of the second portion.

7. The assembly according to claim 6, wherein the opening of the second portion includes a slot.

8. The assembly according to claim 6, wherein the stripper shoe includes a bolt for fastening the stripper shoe to the second portion of the plunger component and wherein the opening of the second portion is configured to receive the bolt.

9. The assembly according to claim 6, wherein the first end of the plunger component is attached to the head structure by welding.

10. The assembly according to claim 9, wherein the plunger component includes a solid bar having a first side and a second side and wherein the first end of the plunger component is welded along the first side and the second side.

11. A method of attaching a stripper shoe to a head structure of an assembly for forming masonry units, the method comprising the steps of:

forming at least one plunger component from a metal bar having an elongated body including a first portion with a first end and a second portion with a second end, wherein the second portion is bent such that the second portion defines a curved flange that extends in a substantially perpendicular manner with respect to the first portion, and wherein the second portion has an opening configured to facilitate fastening the stripper shoe to the second portion of the plunger component;

attaching the first end of the at least one plunger component to the head structure; and fastening the stripper shoe to the second portion of the plunger component using the opening.

12. The method according to claim 11, wherein the at least one plunger component includes a solid bar having a first side and a second side and wherein the step of attaching the first end further includes welding the at least one plunger component to the head structure along the first side and the second side.

13. The method according to claim 11, wherein the step of forming the at least one plunger component further includes forming a slot as the opening in the second portion.

14. A method of manufacturing a head unit for a molding machine, the method comprising the steps of:

bending a flat metal bar having a first end and a second end such that the first end defines a curved flange that extends in a substantially perpendicular manner with respect to the second end of the flat metal bar;

cutting an opening in the first end of the flat metal bar;

attaching the second end of the flat metal bar to an upper head structure of the manufacturing head; and attaching the first end of the flat metal bar to a stripper shoe.

15. The method for manufacture according to claim 14, wherein said second end of said flat metal bar is attached by welding.

16. A system for compacting a material and stripping the material from a mold, said system comprising:

a head structure; and a plunger component attaching a stripper shoe to the head structure, the plunger component comprising a metal bar having an elongated body including a first portion with a first end attached to the head structure and a second portion with a second end, wherein the second portion is bent such that the second portion defines a curved flange that extends in a substantially perpendicular manner with respect to the first portion, and wherein the second portion includes an opening;

at least a first set of stripper shoes; and at least a second set of stripper shoes;

wherein the first set of stripper shoes and the second set of stripper shoes are interchangeably connectible to the opening of the second portion.

* * * * *